(12) United States Patent
Li

(10) Patent No.: US 10,264,207 B2
(45) Date of Patent: Apr. 16, 2019

(54) METHOD AND SYSTEM FOR CREATING VIRTUAL MESSAGE ONTO A MOVING OBJECT AND SEARCHING THE SAME

(71) Applicant: Yu-Hsien Li, Taipei (TW)

(72) Inventor: Yu-Hsien Li, Taipei (TW)

( * ) Notice: Subject to any disclaimer, the term of this patent is extended or adjusted under 35 U.S.C. 154(b) by 30 days.

(21) Appl. No.: 15/581,851

(22) Filed: Apr. 28, 2017

(65) Prior Publication Data
US 2018/0184038 A1 Jun. 28, 2018

(30) Foreign Application Priority Data

Dec. 23, 2016 (TW) .............................. 105143001 A

(51) Int. Cl.
| | |
|---|---|
| *H04N 5/445* | (2011.01) |
| *H04N 5/232* | (2006.01) |
| *G06T 7/70* | (2017.01) |
| *G06F 16/532* | (2019.01) |
| *G06T 11/00* | (2006.01) |
| *G06T 19/00* | (2011.01) |
| *G06K 9/00* | (2006.01) |
| *G06K 9/46* | (2006.01) |

(Continued)

(52) U.S. Cl.
CPC ....... *H04N 5/44504* (2013.01); *G06F 16/532* (2019.01); *G06K 9/00671* (2013.01); *G06K 9/4642* (2013.01); *G06K 9/6212* (2013.01); *G06T 7/70* (2017.01); *G06T 11/00* (2013.01); *G06T 19/006* (2013.01); *H04N 5/23229* (2013.01); *G06T 2207/30201* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 8,400,548 B2 * | 3/2013 | Bilbrey | G06F 1/1694 348/333.01 |
| 9,418,293 B2 | 8/2016 | Ito et al. | |
| 9,953,446 B2 * | 4/2018 | Lyons | G06T 11/001 |

(Continued)

FOREIGN PATENT DOCUMENTS

| | | |
|---|---|---|
| CN | 102194007 A | 9/2011 |
| CN | 102326185 A | 1/2012 |

(Continued)

*Primary Examiner* — James M Hannett
(74) *Attorney, Agent, or Firm* — Li & Cai Intellectual Property (USA) Office

(57) ABSTRACT

The disclosure is related to a system and a method for creating a virtual message on a moving object, and for searching the virtual message. Under a data-construction mode, a user manipulates a mobile device to select a virtual message, and to capture a moving object. The mobile device allows the user to position the virtual message on the moving object. The system then receives data of the virtual message, the image information extracted from the moving object, and a viewable range for the virtual message relative to the moving object. The image information is employed to be the reference for the position of the virtual message. Under a search mode, the system renders a service for searching the virtual message over a specific moving object according to the image information of the moving object and the location of the mobile device.

19 Claims, 14 Drawing Sheets

(51) Int. Cl.
*G06K 9/62* (2006.01)
*H04W 88/02* (2009.01)

(56) References Cited

U.S. PATENT DOCUMENTS

| | | | |
|---|---|---|---|
| 2006/0190812 A1* | 8/2006 | Ellenby | G06F 17/30259 |
| | | | 715/209 |
| 2007/0162942 A1* | 7/2007 | Hamynen | G06F 17/3087 |
| | | | 725/105 |
| 2009/0232354 A1* | 9/2009 | Camp, Jr. | G06Q 30/02 |
| | | | 382/103 |
| 2010/0257252 A1* | 10/2010 | Dougherty | G06T 19/006 |
| | | | 709/217 |
| 2013/0120373 A1 | 5/2013 | Morinaga et al. | |
| 2014/0253743 A1 | 9/2014 | Loxam et al. | |
| 2015/0262391 A1 | 9/2015 | Chau | |

FOREIGN PATENT DOCUMENTS

| | | |
|---|---|---|
| CN | 102792338 A | 11/2012 |
| CN | 104616190 A | 5/2015 |
| JP | 2011128977 A | 6/2011 |
| JP | 2011244398 A | 12/2011 |
| JP | 2013114653 A | 6/2013 |
| JP | 2014127148 A | 7/2014 |
| JP | 2016130985 A | 7/2016 |

\* cited by examiner

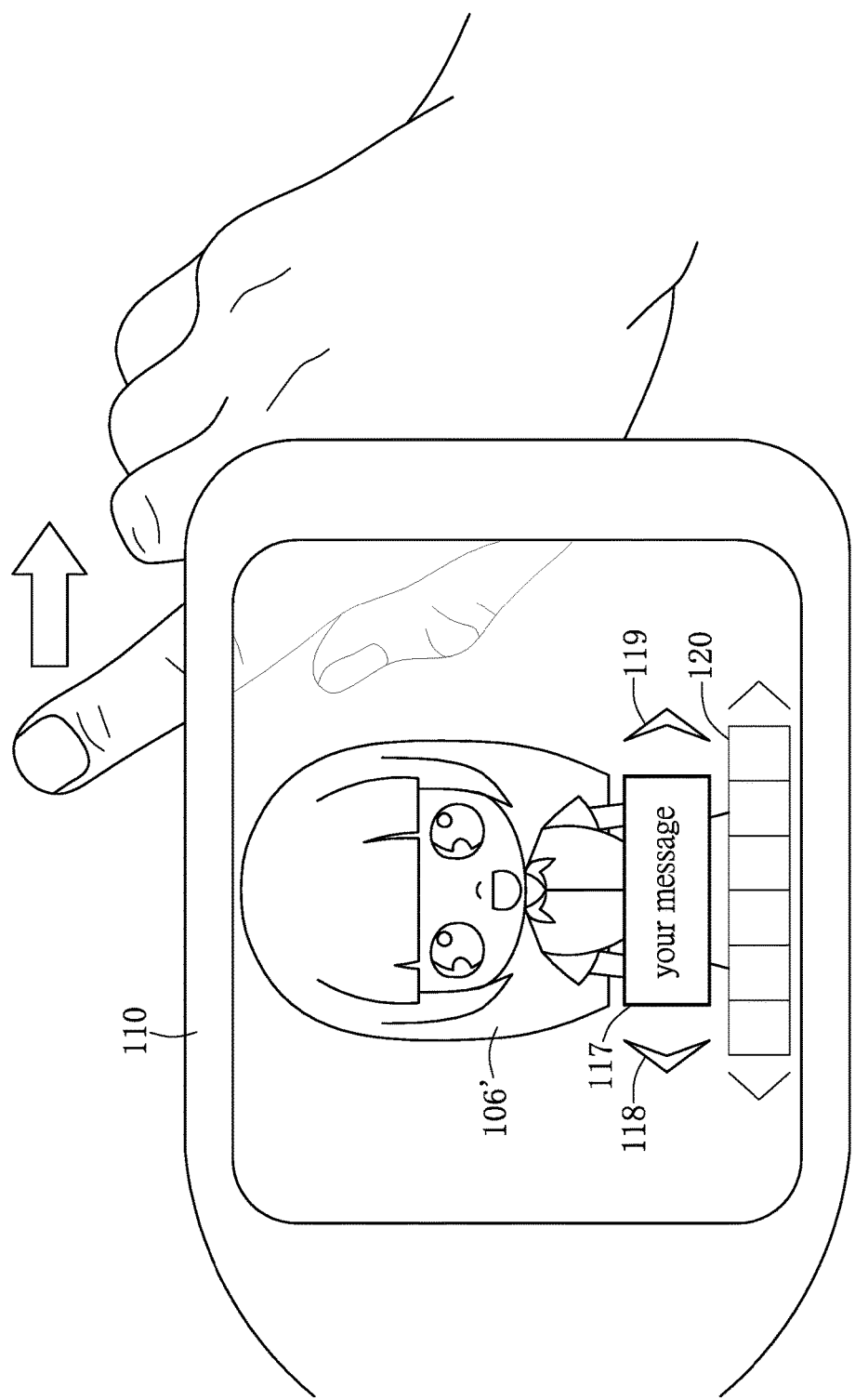

METHOD AND SYSTEM FOR CREATING VIRTUAL MESSAGE ONTO A MOVING OBJECT AND SEARCHING THE SAME

BACKGROUND OF THE INVENTION

1. Field of the Invention

The present invention is generally related to a method and a system for creating and searching a virtual message in a space, and in particular, to the method and system for creating the virtual message onto a moving object that is searchable and viewable by a user using a mobile device.

2. Description of Related Art

According to a conventional application, a user utilizes a mobile device to execute a proprietary application, e.g. an app, for activating a camera module. The camera module is driven to capture a real scene, and the real scene is displayed on a screen of the mobile device. The application enables an augmented reality technology that allows an image object to be shown in the real scene.

In general, the augmented reality technology requires a software routine to recognize a marker within the real scene through the camera module of the mobile device. The marker is referred to in order to initiate the image object. The augmented reality technology uses a well-defined correlation between the marker and the image object to show the image object in the software routine.

Another conventional augmented reality technology relies on location-based information to initiate the image object. This means that the image object defined in the software is initiated based on a location of the mobile device. A user manipulates the mobile device to find and display the image object based on its location that is rendered by a global positioning signal generated by a GPS module installed in the mobile device. In the meantime, an azimuth angle signal can be generated by a gyroscope of the mobile device for positioning an elevation angle of the mobile device. This positioning information acts as reference provided for a server that directs the software program in the mobile device to show the image object.

These mentioned technologies of augmented reality or location-based method merely create a circumstance that allows the user to experience reality and facilitate recreation.

SUMMARY OF THE INVENTION

In the present disclosure, a method for creating a virtual message associated to a moving object, a method for searching the virtual message, and an application system thereof is provided. The application system is provided for a user to download a software program using a mobile device. While the software program has been executed, a software sequence enters a data-construction mode, or a search mode. Under the data-construction mode, the system provides an interface allowing the user to create a virtual message onto a mobbing object using the mobile device by means of the software program. The system allows the user to set up a viewable range for the moving object, and provides a searching engine in respect of the virtual message. Under the search mode, a server of the system obtains positioning information of the mobile device held by the user. An image of the moving object renders the information for searching and displaying the virtual message.

In one further embodiment, in the method for creating the virtual message onto the moving object, under the data-construction mode, the software program executed in the mobile device obtains a selected virtual message, and also receives the image of a selected moving object. The software program then renders positioning information associated to the virtual message. The positioning information is such as the image information associated to the moving object. Next, the data of the virtual message and the positioning information associated to the virtual message are uploaded to the server, and a viewable range is set. The system provides a database of the virtual messages such as a text, a picture, a video, or a sound, or any combination thereof.

In one embodiment of the disclosure, the positioning information for searching the virtual message is essentially the image information of the moving object associated to the virtual message. The image information can render color block and line data through an image processing process. The color block data, the line data and the viewable range associated to the virtual message in view of the positioning information of mobile device form the reference used to position the virtual message.

In one another embodiment of the disclosure, under the search mode in the method for searching the virtual message, the software program executed in the mobile device receives an image of the moving object. The image information associated to the moving object can be computed. The mobile device generates the positioning information related to the moving object. The positioning information is such as ground-position data. The information for positioning the virtual message includes the positioning and the image information that are uploaded to the server of the system. A computation process performed in the server compares the received information with the database. A search result that matches a searching criteria and the positioning information can be generated. The virtual message in the search result is then displayed on the mobile device.

The virtual message corresponding to the positioning information can be directly displayed over the moving object on the mobile device. The virtual message is then overlapped over a corresponding position of the moving object. The purpose of searching the virtual message over the moving object can be achieved.

In one further aspect of the disclosure, an application system is provided. The application system includes a server and a database. The system includes an instruction set stored in a non-transitory computer-readable medium of a mobile device. The instruction set is executed by a processor of the mobile device for performing a process of creating and searching the virtual message of the moving object. The instruction set includes an image-retrieving instruction for retrieving an image of the moving object that is displayed on the mobile device; a virtual message processing instruction for processing the virtual message associated with the moving object in the mobile device, and forming a data of the virtual message transmitted to the server; a position data generating instruction for obtaining positioning information generated by a ground-positioning unit of the mobile device; an image information generating instruction for processing the image of the moving object, and generating image information used to position the virtual message; a search processing instruction for obtaining the positioning and the image information generated by the mobile device under a search mode, transmitting the positioning and the image information to the server, and receiving a search result that matches a searching criteria from the server; a data transmitting and receiving instruction for establishing a connection between the mobile device and the server for transmitting and receiving signals there-between; and a virtual message display instruction for displaying the virtual message based on the search result.

BRIEF DESCRIPTION OF THE DRAWINGS

FIG. 11 shows a schematic diagram depicting another circumstance that a virtual message associated to the moving object is displayed in one further embodiment of the present disclosure.

DETAILED DESCRIPTION OF THE PREFERRED EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present disclosure is related to a method for creating a virtual message associated to a moving object, a method for searching the virtual message, and an application system thereof. The application system includes a cloud system and a software program stored in a non-transitory computer-readable medium of a mobile device. The cloud system has a server and a database. The system renders a user management interface that allows the user to upload the positioning information and capture the image of the moving object using the mobile device. The application system renders the database, which provides a searching service, based on the data relating to the virtual message, uploaded by the mobile device, and associated to the moving object. The searching engine is thereby established. The searching engine allows the user to search the virtual message associated to the moving object captured by the user.

The following diagram schematically shows a circumstance describing the method that a user uses a mobile device to create a virtual message onto a moving object.

Figure 1A:
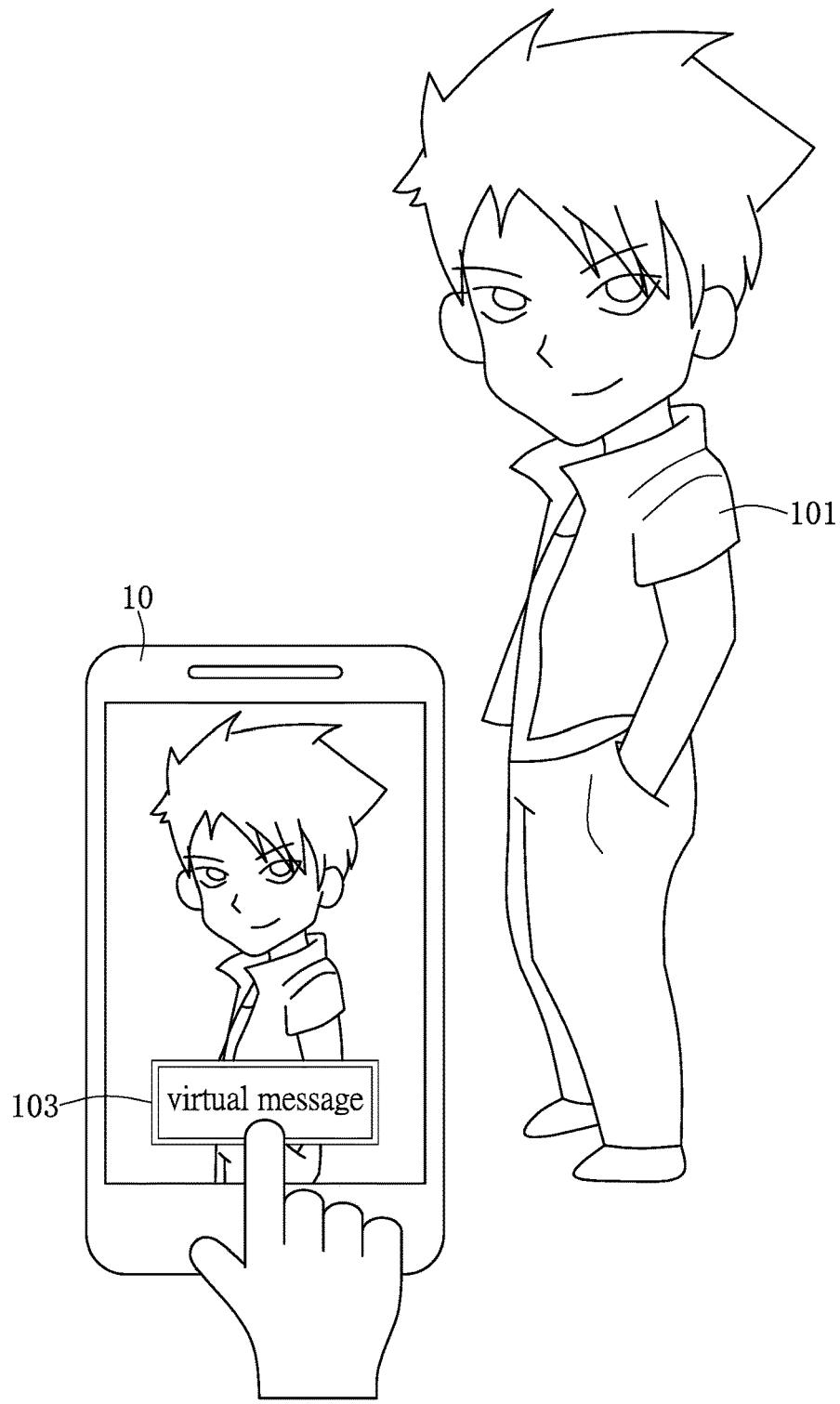
FIG. 1A and FIG. 1B show a schematic diagram depicting a scenario where a user uses a mobile device to create a virtual message onto a moving object.

In FIG. 1A, the diagram schematically shows a user who manipulates a mobile device 10. The mobile device 10 can be any portable device such as a smart phone, a tablet computer or a glasses-type intelligent device that is able to capture an image of a real scene, generate positioning information and have capability of computation.

In the beginning, the user uses the mobile device 10 to download and install a software program provided by an application system. The software program is such as an app installed in an intelligent device. When the software program is executed in the mobile device 10, the software enters a data-construction mode firstly. A camera module of the mobile device 10 is then activated. The mobile device 10 manipulated by the user is directed toward a moving object 101 where a virtual message 103 is configured to be annotated to. An image of the moving object 101 is be captured. The moving object 101 is exemplified as a person shown in the diagram in the current example. The moving object can also be a car or an aircraft. For annotating the virtual message 103 onto the moving object 101, the moving object 101 can be first displayed on a screen of the mobile device 10 when the mobile device 10 is directed toward the moving object 101. In the meantime, a technology of augmented reality (AR) can be used for allowing the user to input the virtual message such as a text, a picture, a video, or a sound, or any combination thereof. Any input method, such as a touch gesture for a touch-sensitive display of the mobile device 10, or an air gesture for a glasses-type intelligent device, can be used to conduct the input. The virtual message is a new message added onto the moving object 101.

The moving object 101 is exemplified as the person shown in the diagram. In an exemplary example, when the person's attire is identifiable enough, the user may be attracted to place the virtual message 103 on his body or any area around him. For example, the virtual message 103 that is configured to be placed on the person may be an advertisement, a special offer, or a message specified to an individual person or a group of people. The user manipulates the mobile device 10 to point toward the moving object 101, and places the virtual message 103 that is instantly displayed on the screen of the mobile device 10 on the moving object 101.

When the user confirms that the virtual message 103 has been annotated onto a position of the moving object 101, the software program executed in the mobile device 10 transmits the image information of the position of the moving object 101 corresponding to the virtual message 103 to the server of the system. The image information uploaded to the server can include information of color block and/or line that acts as a reference to position the virtual message 10. Further, the data uploaded to the server includes the ground-position data and/or spatial angle data of the mobile device 10 at the moment the virtual message 103 is created. The ground-position data is such as the location data sensed by a GPS in the mobile device 10. The spatial angle data is such as a combination of an azimuth angle and/or an elevation angle sensed by a gyroscope of the mobile device 10. It should be noted that the instant positioning information of the mobile device 10 may derive a viewable range of the virtual message 103.

Secondarily, the software program enters a search mode. The image information of the moving object 101 can be the color block data and/or the line data between the color blocks of the moving object 101 associated to the virtual message 103. It should be noted that the search mode can be performed by another software program executed in the mobile device 10. The color blocks extracted from the moving object 101 is formed by the cloth patterns of the clothing of the person. The positioning information of the mobile device 10, and the color block data and/or line data of the moving object 101 render the references for displaying the virtual message 103. The aforementioned information can be stored to the cloud server of the application system. The image information of the moving object 101 defines the position of the virtual message 103. Once the mobile device 10 generates these references and uploads them to the cloud server, the cloud server will query the database by comparing the data. The virtual message 103 can therefore be found. In general, the ground-position data and the image information, e.g. the color block and/or line, are the requisite information for the server to find the virtual message 103. A search result will be finally produced and sent to the mobile device 10.

One of the parameters of the viewable range associated to the virtual message 103 is a distance between the mobile device 10 held by the user and the moving object 101. This distance between the mobile device 10 and the moving object 101 can be determined by a proximity sensor of the mobile device 10, or through the image information. Further, the positioning information of the moving object 101 and the positioning information of the mobile device 10 can define the distance there-between. For example, a person registers the moving object 101 to the application system. The user, rather than the person, creates the virtual message over the moving object 101. Accordingly, the application system can obtain both the account information of the user who uploads the virtual message and the account information of the person, i.e. the moving object 101. The system can determine if the user falls within the viewable range associated to the moving object 101 according to the locations of both the moving object 101 and the mobile device 10. This computable distance between the moving object 101 and the user's mobile device 10 acts a basis to determine if the user can see the virtual message 103.

In one embodiment, the moving object 101 can be a person. The person's face can be an important data for recognizing the person in addition to the above-mentioned color block data and/or line data associated to the moving object 101. The face can be registered in the system. Under the data-construction mode in the current example, when the user sets up the virtual message 103 on an area of the person, the mobile device 10 can be used to capture an image of the face. The software program is used to extract the image information from the face through a computation process. The image information is registered to the system when it has been transmitted to the server of the system. The image information of face acts as one of the references allowing the other users to search the virtual message 103 under the search mode.

The mentioned color block data, line data, and/or the image information for recognizing the face of the person (the moving object) are provided for the server to conduct recognition for obtaining the virtual message associated to the moving object 101. According to one embodiment of the disclosure, in the server, an image recognition process applying an artificial intelligence is used to process the image information of the moving object 101. The image information of the moving object transmitted by the mobile device 10 to the server is used to recognize the moving object through a computation process.

Further, when the user uses the mobile device 10 to display the virtual message 103, the software program renders an interface acting as a link icon that allows the user to click for obtaining more information relating to the virtual message 103. It should be noted that the virtual message 103 itself can also be a link button for the user to acquire more information. The further information behind the link icon is provided by the system. Alternatively, the information may be already included in the virtual message 103 when it is created. For example, the virtual message 103 can be an advertisement that allows the user to click for obtaining further introduction to a product, directions to a store, or a promotional sale and special offer. The virtual message 103 can be a personal message that only permits a specific user or group to see.

Figure 1B:
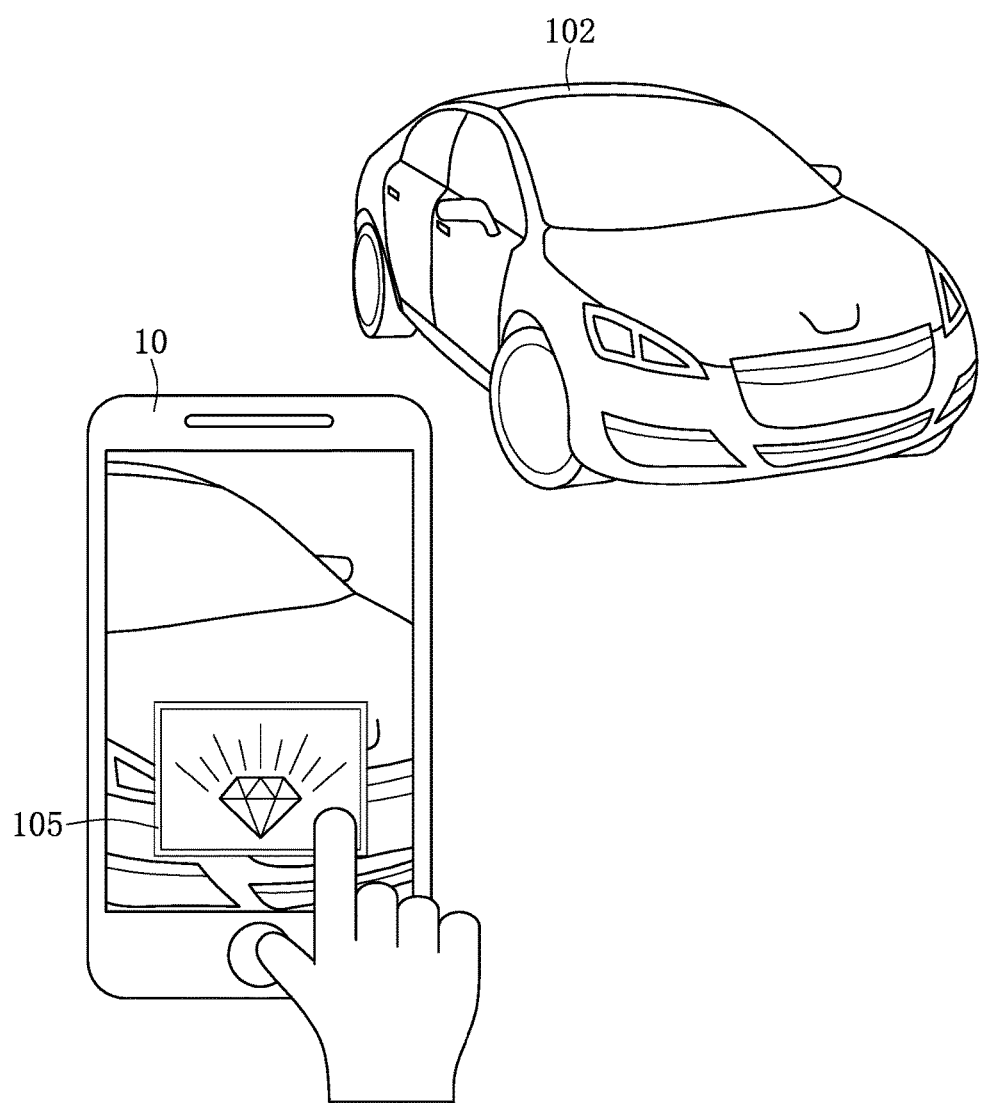

FIG. 1B shows a schematic diagram depicting a circumstance that a virtual message is created on a moving object.

The user uses the mobile device 10 to initiate the software program. Under the data-construction mode, a camera module is activated. The user manipulates the mobile device 10 towards a moving object 102, e.g. a car in the current example. In the meantime, a virtual message 105 is accurately overlapped with the moving object 102 at a specific position through a technology of augmented reality (AR). The virtual message 105 in the current example is a picture that conveys advertisement content. The virtual message 105 can be a text, a video or a picture that is used to introduce a product. In addition to uploading the data of the virtual message 105, the image information relating to the position where the virtual message 105 is placed is also uploaded to a server. For example, the image information of the moving object 102 shown in the diagram is the color block data and/or the line data between the color blocks of the painting of the car that acts as the background of the virtual message 105. When the virtual message 105 has been created, the positioning information generated by the mobile device 10 may form the reference for searching the virtual message 105. However, the positioning information of the mobile device 10 can be ignored since it is merely an auxiliary data for positioning the virtual message 105.

In an exemplary example, sometimes when the moving object 102 is indoors, the software program executed in the mobile device 10 cannot obtain the positioning data. Under this circumstance, in addition to drawing aid from assisted positioning scenarios utilizing various indoor wireless signals, the virtual message 105 can also be determined based on only the image information uploaded by the mobile device 10. Therefore, this scheme allows the virtual message 105 to be determined even when the system fails to obtain the positioning information of the mobile device 10.

Furthermore, when the virtual message 105 has been created, the user can give the virtual message 105 more functionalities. For example, the user sets up a link, e.g. URL, to the virtual message 105 that allows the other users to acquire further information that may relate to this virtual message 105 when searching the virtual message 105. The link can be used to link to another webpage for further interaction. The link can provide the interaction service that renders an interface for video conference, messaging, or shopping.

Still further, in addition to the ground-position data provided as a basis for searching the virtual message, a spatial angle data generated by the mobile device may also be one further basis for searching. In an exemplary example, the virtual message can be placed at an elevation angle with respect to the moving object due to a height of the moving object. The viewable range associated to the virtual message may include a spatial angle.

Figure 2A:
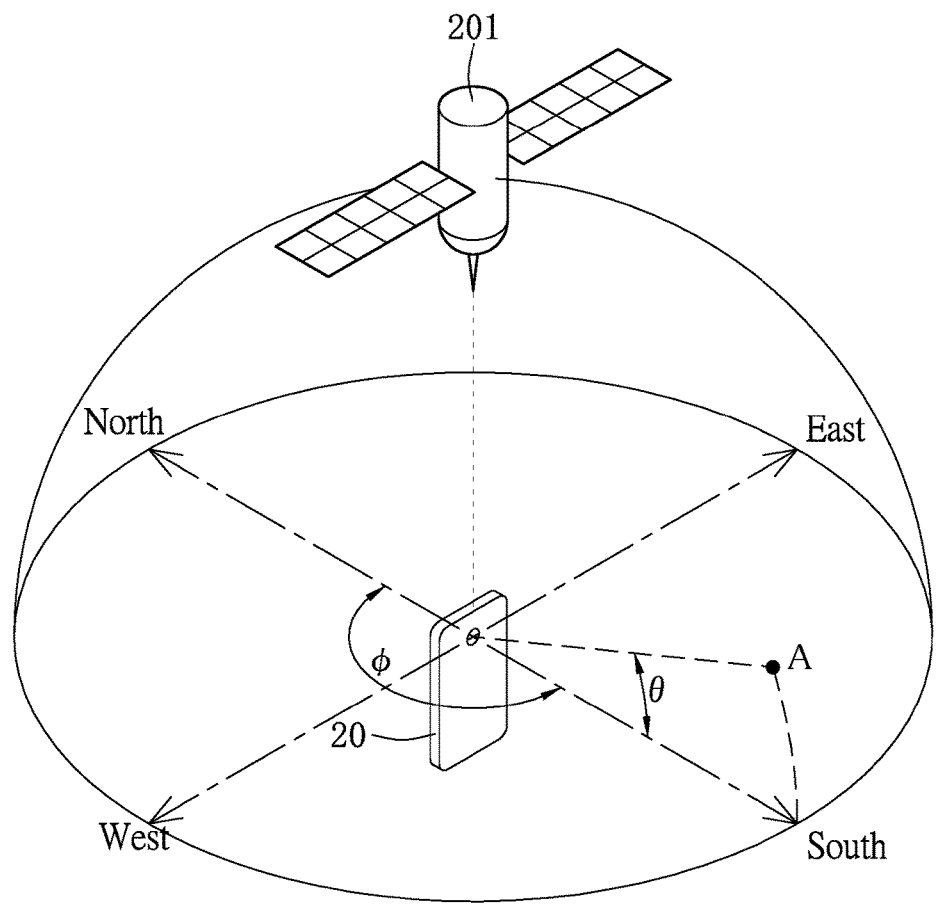
FIG. 2A shows a schematic diagram depicting coordinates indicating a space-angle data.

The schematic diagram shown in FIG. 2A depicts the formation of the space-angle data. A spatial coordinate system can be exemplarily defined by a pair of an azimuth angle $\varphi$ and an elevation angle $\theta$. The azimuth angle $\varphi$ is especially an angular measurement of a spherical coordinate system. In one aspect of the present invention, the mobile device 20 renders the spatial coordinate system. An origin of the spatial coordinate system indicates a position where the mobile device 20 held by the user, e.g. an observer, is located. The horizontal plane develops the spherical coordinates for defining the azimuth angle $\varphi$ ranging from 0-degree angle (direction of North), 90-degree angle (direction of East), 180-degree angle (direction of South), 270-degree angle (direction of West), and to 360-degree angle (back to direction of North). The azimuth angle can be described based on a reference axis, e.g. the North axis, for defining an azimuthal direction of the mobile device 20. For example, the direction A that a rear camera of the mobile device 20 points toward indicates the azimuthal direction. This direction A constitutes the azimuth angle $\varphi$ and the elevation angle $\theta$. Both the azimuth angle $\varphi$ and the elevation angle $\theta$ can be determined by a space-positioning unit in the mobile device 20. A combination of the azimuth angle $\varphi$ and the elevation angle $\theta$ forms the space-angle data for the direction A. When this space-angle data is combined with the ground-position data generated in the mobile device 20 through the positioning satellite 201, the mobile device 20 can be positioned by its position and pointing direction. A kind of spatial information is therefore formed. The spatial information is provided to the application system for obtaining a virtual message that is displayed on the mobile device 20 through an operation procedure.

Figure 2B:
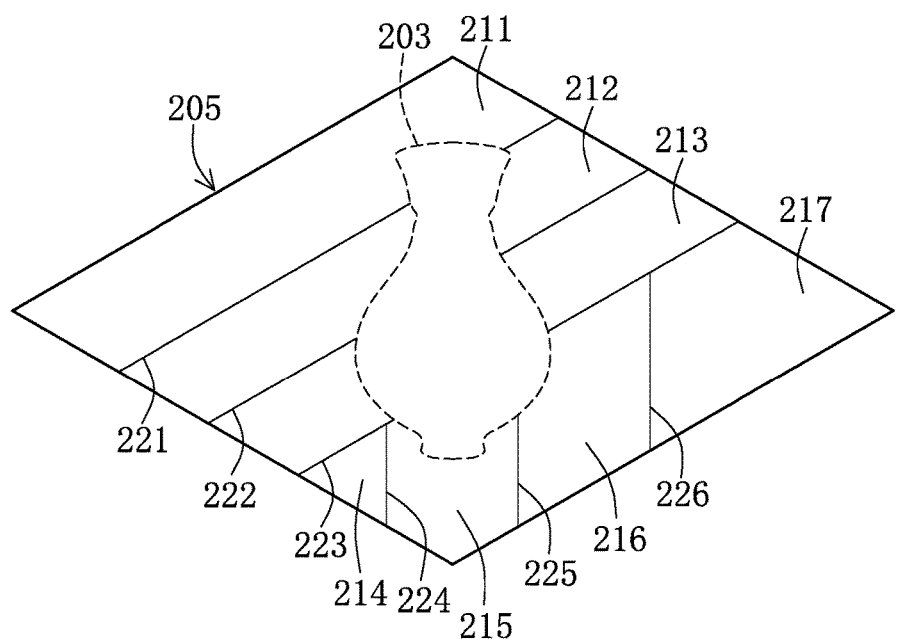
FIG. 2B shows a schematic diagram retrieving image information relating to a background of the virtual message.

FIG. 2B shows a schematic diagram depicting a technique to obtain the image information with respect to a virtual message. A virtual message 203 indicated by a dotted-line frame in the diagram is positioned over a background image 205, e.g. a moving object as recited in the present disclosure. When the virtual message 203 has been created, the server acquires information relating to the virtual message 203 from the mobile device at the user end. The information relating to the virtual message 203 includes an image of the virtual message 203, and its positioning information such as a ground-position data and a space-angle data. The image information of the background image 205 can also be acquired by the server. The positioning information, optionally with the image information of the background image 205, constitutes the parameters of spatial information for locating the virtual message 203. Further, more information can be annotated to the virtual message 203. For example, a hyperlink can be annotated to the virtual message 203 that allows a user to acquire further information when searching the virtual message 203. The hyperlink is clickable to link a webpage or a shopping interface for further interaction.

The image information of the background image 205 can be composed of a color block and a line data through an image processing process. In one embodiment, the image processing process can be performed using a software program executed in the mobile device, or in the cloud-based server. The image processing process extracts the characteristics such as the color blocks and the lines therebetween from the background image 205. Both the color blocks and the lines act as the parameters for locating or identifying the virtual message.

In an exemplary example, the pre-processing method first sketches the background image 205, for example, using the lines 221, 222, 223, 224, 225, and 226. The blocks 211, 212, 213, 214, 215, 216, and 217 are formed by the lines 221, 222, 223, 224, 225, and 226. After that, an average of the pixel values in every block can be computed. The average denotes a color block data with respect to every block. In one further embodiment, a normalization method can be performed onto the pixels of every block so as to compute the characteristic value of every block. The characteristic value is regarded as the block's color block data. It should be noted that the image pre-processing method is not limited to the above disclosure. The image under the pre-processing method is not limited to be within any specific chromatic space, but it can be within an RGB space, a HSV (Hue, Saturation, and Value) space, or a CMYK (Cyan, Magenta, Yellow, and Black).

It is worth noting that, the information relating to the lines 221, 222, 223, 224, 225, and 226 for the background image 205 conveys a line data that acts as the reference for displaying the virtual message 203. Through the image processing process, the virtual message 203 can be appropriately positioned on the plane, such as on an area of the moving object.

Figure 3:
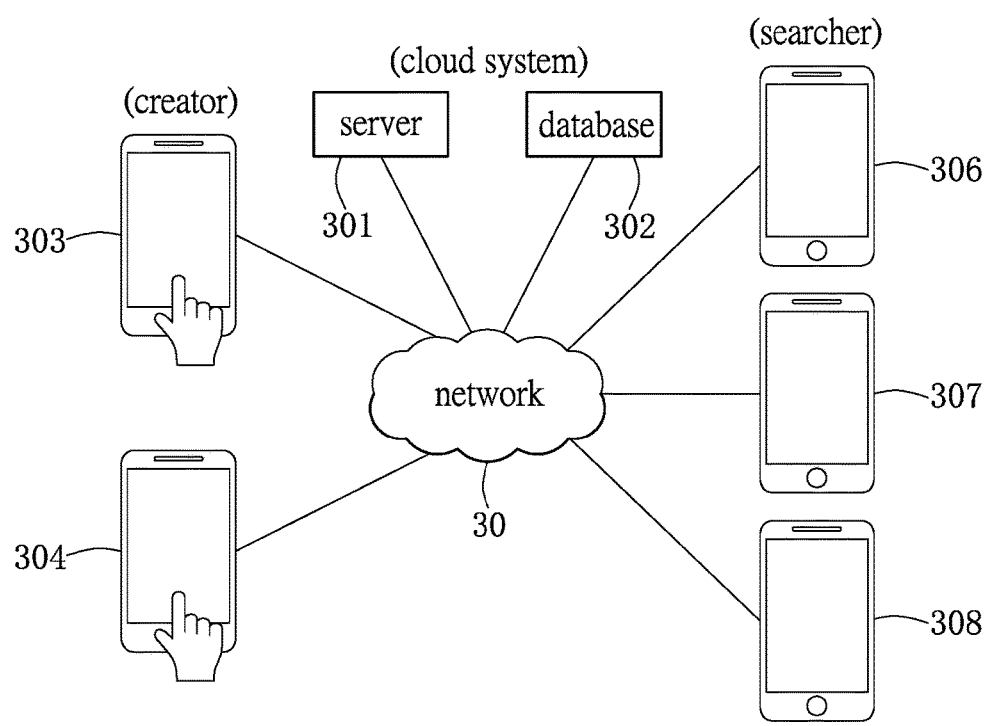
FIG. 3 shows a schematic diagram depicting a network framework of a system for creating and searching the virtual message associated to the moving object according to one embodiment of the present disclosure.

Reference is made to FIG. 3, schematically depicting a network framework of the system for creating and searching a virtual message onto a moving object according to one embodiment in the disclosure.

The system for providing the service of creating and searching the virtual message associated to the moving object can be a network-based system. A server 301 and a database 302 form a cloud system. The database 302 records multiple virtual messages and their corresponding positioning information. The positioning information is such as image information of the moving object for placing the virtual message that can be uploaded by the end user, or the application system itself can also build its own data. The database 302 acts as a data source for searching the virtual message. The database 302 includes a virtual message database used to record data of the virtual message, and a search database used to record image information associated to the virtual message and searching criteria with respect to the virtual message.

The server 301 mainly processes the signals transmitted by the user-end mobile device. The signals transmitted by the user-end mobile device can be the reference used to search the virtual message. When compared with the data in the database 302, the system provides a search result. The network-based application system provides the service of searching the virtual messages over a network 30. The data of the database 302 is mainly the virtual message uploaded by the terminal users. A software interface initiated in the user-end device is provided for the user to search the virtual message in the database 302.

The end users are exemplarily shown as creator devices 303 and 304. The user utilizes the mobile device to set up a virtual message onto a specific moving object by any available input method. For example, the user can utilize a touch-sensitive screen of the mobile device to set up the virtual message by a touching gesture. The user can use a glasses-type intelligent device to place the virtual message over the moving object by waving his hand. The virtual message, e.g. a text, a picture, a video, or a sound, or a combination thereof, is combined with the moving object, and the combination forms the positioning information associated to the virtual message. The moving object itself forms the image information for positioning the virtual message. The image information is such as the color block data and/or line data extracted from the moving object through an image processing process.

The creator devices 303 and 304 create virtual messages and their corresponding positioning information. The data of virtual messages are uploaded to the server 301 of the system over the network 30. The server 301 stores the data in the database 302. The application system provides the searcher devices 306, 307 and 308 to search the virtual messages in the database 302 over the network 30 using the software programs installed in their mobile devices. For example, the user can utilize the mobile device to initiate the software program and activate a camera module to capture an image of a moving object. The image information associated to the moving object can be extracted. The software program obtains the positioning information such as ground-position data and/or spatial angle data generated by a positioning circuit of the mobile device. The image information and the positioning information are transmitted to the server 301. The system provides a search result while compared with the data in the database. The search result is generated based on the image information, e.g. the color block data, line data and/or facial recognition, and the positioning information of the mobile device. After that, the virtual message in the search result is displayed on the display of the mobile device.

It is worth noting that the application system receives the data of the virtual message and the corresponding positioning information from the creator devices 303 and 304 through the software program. The positioning information can be the image information of the moving object. The searching criteria for searching the virtual message can be provided by the application system or the end user. The searching criteria provided by the creator device 303 or 304 is based on a spatial relationship between the creator device 303 or 304 and the moving object. The searching criteria associated to the virtual message can be one of a time period, a viewable range and a user segment, or any combination thereof.

For example, when the virtual message is created, a relation of a distance or an elevation angle between the creator device 303 or 304 and the moving object is formed. The difference of distance or elevation angle forms the viewable range. The viewable range indicates a distance range or an angular range measured from the moving object for seeing the virtual message. The application system sets up a distance threshold that is used to determine if the searcher device 306, 307 or 308 can see the virtual message associated to the moving object. If the distance difference between the searcher device 306, 307 or 308 and the moving object is outside the distance threshold, the searcher device 306, 307 or 308 cannot see the virtual message, whether the searcher device is too close to or too far away from the moving object.

Figure 4A:
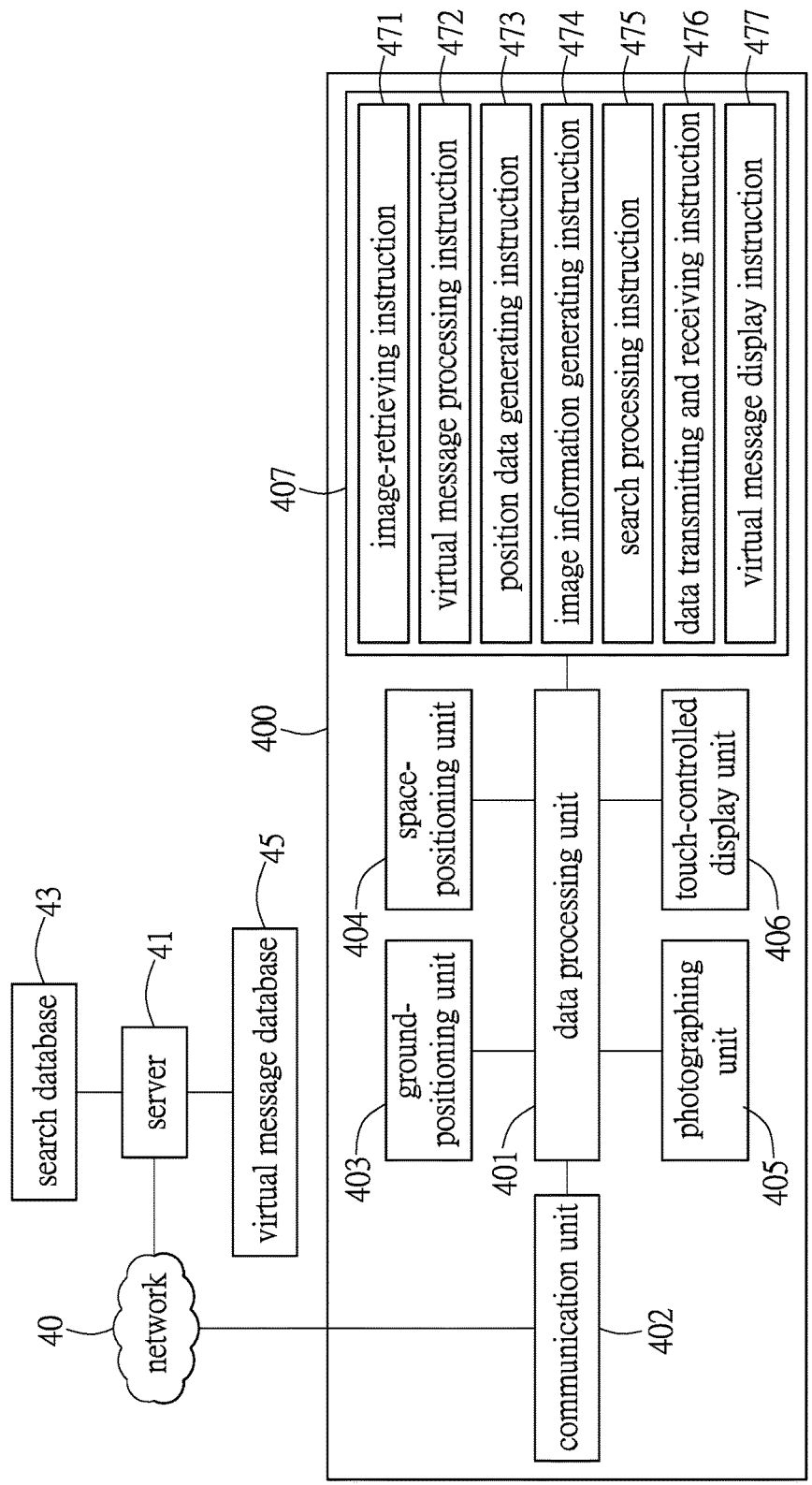
FIG. 4A shows a schematic diagram describing software modules of the mobile device in an application system in one embodiment of the present disclosure.

FIG. 4A shows a diagram depicting the software modules of the cloud system and the mobile device respectively in one embodiment of the present disclosure.

The system includes a cloud-based server 41. The server 41 is implemented by a computer system, or a cluster of multiple computer systems for operating various functions. The server 41 is mainly used to receive the data of a virtual message and corresponding positioning information uploaded by the user-end mobile device 400 so as to establish a database. Establishment of the database can be based on a search database 43 and a virtual message database 45. The database is used to record the data generated by the user-end mobile device, especially the positioning information associated to the virtual message.

The database is such as a data storage medium that can be divided to the search database 43 and the virtual message database 45. Both the databases 43 and 45 can be installed into one server, or different sites. The virtual message database 45 mainly records the data of the virtual message uploaded by the mobile device 400. The virtual message can be any type or any combination of a text, a picture, a video, and a sound. The video may comprehensively include a plane graphic animation or a 3D animation. The virtual message database 45 simultaneously acts as the source provided for the user to search for the virtual messages using the mobile device 400. The search database 43 mainly records further information relating to the virtual message uploaded by the mobile device 400. The information is such as the positioning information with respect to the virtual message, and/or including the color block and line data corresponding to the scene where the virtual message is positioned. The color block and the line data extracted from the real scene related to the virtual message act as the reference for locating the virtual message. The server 41 performs a computation procedure of comparison using the positioning information recorded in the search database 43. One or more virtual messages can be found in this preliminary procedure. Every virtual message has its identification that is recorded in the virtual message database 45 and delivered to the user-end device.

According to one of the embodiments, the computation performed in the server 41 can be an image recognition process applying an artificial intelligence that generally conducts a deep-learning process. After multiple times of processing and learning, a higher degree of recognition for recognizing the moving object can be obtained.

For example, a virtual message is established at a place correlated to a real scene, and a time period can be set. The time period acts as one of the searching criteria. The time period restricts the user to merely searching for the virtual messages within a time period in which the seeable virtual messages also meet the other searching criteria, such as the conditions including the positioning information and image information. The viewable range confines a seeable distance from the real scene, a viewable plane-position range and/or a viewable space-angle range allowing the user to see the virtual message. The user cannot see the virtual message until the mobile device 400 held by the user moves within the viewable range.

For example, the user can set up the time period when the virtual message is created over the moving object. The time period acts as one further condition for searching the virtual message in addition to the image information associated to the virtual message. The virtual message is searchable when the time of search is within the time period. Further, the viewable range can be a condition to restrict a distance range for seeing the virtual message. The user can see the virtual message that matches the image information associated to the moving object if the mobile device 400 is within the viewable range. The user segment is provided to prescribe who can see the virtual message even when the virtual message matches the image information associated to the moving object. In one aspect of the method, the user segment defines a range of users who are within a specific group among the people, one or more individuals, or specified to a certain number of the users. For example, the user segment allows the user to create the virtual message being viewable to the people of an age range, and the system can identify the user IDs to be the viewable users. The user segment acts as one of the searching criteria made by the server and is configured to permit one or more persons to see the virtual message. In this scenario, a user ID for identifying the user can be simultaneously transmitted to the server when the user utilizes the mobile device 400 to search the virtual message.

The application system establishes a searching engine provided for the user to search the virtual message using the mobile device. The searching engine is based on the database including the search database 43 and the virtual message database 45 that records the data uploaded by the users.

The mobile device 400 is configured to operate the method for creating the virtual message onto the moving object, and also for displaying the virtual message. The mobile device 400 connects to the server 41 over the network 40. The mobile device 400 includes main circuit components such as a data processing unit 401 that is used to process the signals among the circuit components of the mobile device 400, and other circuits electrically connected to the data processing unit 401. The mobile device 400 includes a communication unit 402 that is used to establish a connection to an external device. A ground-positioning unit 403 in the mobile device 400 is used to sense the position of the mobile device 400. A space-positioning unit 404 is used to sense the spatial position of the mobile device 400. A photographing unit 405 is for capturing the image of a real scene, e.g. the moving object. A touch-sensitive display unit 406 allows the user to input commands using gestures.

The ground-positioning unit 403 can be implemented by the circuit component of a global positioning system that utilizes positioning signals received from a positioning satellite to generate ground-position data. The positioning scheme can be collaborated with the signals generated by other wireless base stations. The space-positioning unit 404 can be implemented by a gyroscope in the mobile device 400. The gyroscope is used to sense the spatial position of the mobile device 400 in a 3D space, so as to generate a space-angle data essentially constituted of an azimuth angle $\varphi$ and an elevation angle $\theta$.

The system includes a memory unit 407 inside the mobile device 400. The memory unit 407 is such as a non-transitory computer-readable medium that is used to store an instruction set. The instruction set executed by one or more processors of the mobile device 400 is to perform the sequences for creating and displaying the virtual message onto the moving object. The main sequences of the instruction set are as follows.

In the instruction set, an image-retrieving instruction 471 is operated to activate a photographing unit 405 of the mobile device 400 to capture an image of a moving object. If the moving object is a person, the image captured by the mobile device 400 can include a face. The face can be displayed on the mobile device 400. In the instruction set, a virtual message processing instruction 472 is operated to process the virtual message created by the user through a touch-controlled display unit 406 of the mobile device 400, in which the virtual message can be created by the user, or selected from the virtual message database 45 of the system. The data of virtual message is transmitted to the server 41.

Further, a position data generating instruction 473 is used to receive the signals generated by the positioning circuit of the mobile device 400. The positioning information can be generated by the ground-positioning unit 403 and/or the space-positioning unit 404 of the mobile device 400. The positioning information generated by the GPS of the mobile device 400 is a major part of the information for positioning the virtual message. An image information generating instruction 474 is used to process the image of the moving object and generate the image information with respect to the virtual message set onto the moving object. The image information can be the color block data and/or the line data, or include the facial recognition data. A search processing instruction 475 is used to obtain the positioning and the image information from the mobile device 400 under a search mode. The server 41 generates a search result that matches searching criteria when the server 41 receives the positioning and the image information. A data transmitting and receiving instruction 476 is used to establish a connection between the mobile device 400 and the server 41, and to transmit or receive signals there-between. For example, the instruction 476 is operated to transmit the positioning information and the image information, and receive the search result from the server 41. When the virtual message is searched, it will be listed in the search result. After that, a virtual message display instruction 477 is operated to display the virtual message that can be overlapped with the moving object that is associated to the virtual message.

The user can create a virtual message by using a software tool, a photograph, or obtained from the server 41. The system provides libraries such as an image library, a video library, or a sound library for the user to create the virtual message.

Figure 4B:
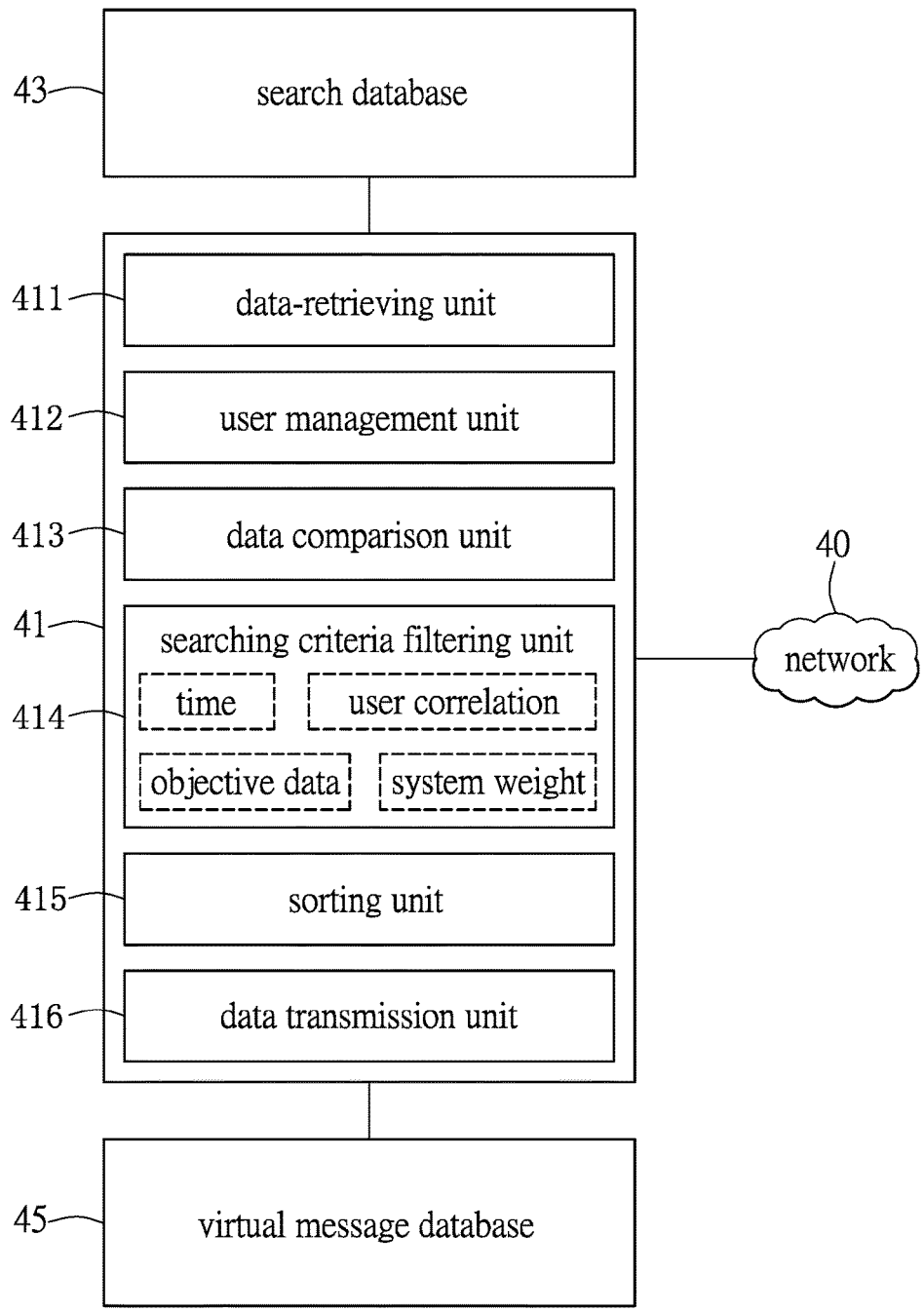
FIG. 4B shows a diagram describing functional modules in a server in one embodiment of the present disclosure.

Next, reference is made to FIG. 4B. FIG. 4B exemplarily shows functional modules of the server in accordance with the present disclosure. The functional modules can be implemented by circuits or with software so as to build a cloud system. The cloud system primarily has a search database 43 that records positioning information with respect to an individual virtual message among the virtual messages. The positioning information exemplarily includes a ground-position data and a space-angle data, or optionally including a color block and a line data of the background image. Each virtual message has its unique ID that acts as a search index. Further, each virtual message has its proprietary search criteria such as any or a combination of a time period, a viewable range, and a user segment that defines a range allowing viewing of the virtual message. It should be noted that the viewable range includes a range of a horizontal angle and an elevation angle. The search criteria act as a basis to conduct searching.

A virtual message database 45 is also provided for storing data of the virtual messages. Every virtual message stored in the virtual message database 45 is in the form of the type of the virtual message. The virtual message is any type or any combination of a text, a picture, a video, and a sound. The ID of the virtual message is used to establish a link to the search database 43 that records every virtual message's positioning information and searching criteria.

The server 41 is a computer system having one or more processors that is used to perform the method for sorting the search result of the virtual messages. The server 41 renders a searching service for the terminal users to conduct the searching using their mobile devices over the network 40. The server 41 provides a result after searching and sorting the virtual messages based on the image information uploaded by the mobile device. The server 41 implements the method by means of hardware or with software.

The server 41 includes a data retrieving unit 411 that can be implemented by circuits for retrieving data from the terminal devices. The server 41 links to the network 40 via a network interface of a host. Therefore, the server 41 is able to receive the positioning and image information generated by the user's handheld mobile device. The positioning information and/or the image information form the reference to search for the virtual messages.

The user management unit 412 utilizes a memory and a sequence to store the security data such as users' identifications and passwords. The memory is also used to constantly save the records transmitted from the user-end mobile devices, and the records form the users' historical records. The historical records also act as a part of the user data and become one of the references for sorting the virtual messages. The user ID becomes an important reference for the system to sort the virtual messages in the search result. By the sorting, the virtual messages relevant to the user can have higher priority ranking.

The data comparison unit 413 uses the image information and positioning information uploaded from the mobile device to enquire the search database 43, and to acquire files of the virtual messages from the virtual message database 45. The files are then delivered to the mobile device. The data comparison unit 413 generates a preliminary search result. The system further conducts a sorting upon the preliminary search result in order to provide the items of interest to the users.

The preliminary search result is under a process of the search criteria filtering unit 414, and a process of sorting, so as to produce a sorted search result. In the sorting process, several filtering criteria can be introduced so that the search result can consolidated to a certain number of the virtual messages. In particular, the result can be much more meaningful to the user requesting the searching.

In an exemplary example, the sorting process is performed based on a user relevant data. The user relevant data recorded in the database can be obtained according to the user ID associated to the space information, e.g. the positioning information and/or image information, in the server 41. When the system receives a user ID from the mobile device, the system can first provide the virtual message(s) relevant to the user. Further, if somebody creates a personal virtual message that is specified to a user or a specific group of users, e.g. a user segment, the system utilizes the user ID(s) to filter out the personal virtual message. The personal virtual message with respect to the user identification can be viewed by enquiring for the user identification of the designated user(s) in the database, and can have highest priority ranking for the designated user(s). On the contrary, users who are not in the user segment cannot see the virtual message. The feature allows the system to exclude users who are unintended for the virtual messages.

Further, the user relevant data utilizes a user preference and/or a historical record to filter out the virtual messages of interest for the user. In the database, each virtual message is relevant to one or more content categories in the database; the preference includes information relating to the one or more user-defined content categories and/or the cloud system determines the one or more content categories according to the historical record. The historical record includes information relating to a staying time and a visiting frequency associated to the virtual message. The system regards a content category as the category of interest to the user when the user stays with the related content for a relatively longer time. Similarly, the visiting frequency of the content may also be a reference to judge the user's interest. The cloud system utilizes the historical records to determine one or more content of interest categories for the users.

Thus, the system causes the virtual messages with higher relevance to have higher priority ranking; on the other hand, the virtual messages with lower relevance will have lower priority ranking. The sorting process may be based on the user relevance of every virtual message.

In one embodiment, the virtual message has a time property. The virtual message provider can assign a time parameter to the virtual message. The time parameter assigned to the virtual message is such as assigning a time period for displaying the virtual message. The time period is used to set an available time, e.g. a morning time, a noon time, or an evening time, allowing the user to see the virtual message. The time parameter is such as an effective display time period assigned to the virtual message. The effective display time period restricts a time period in the server in which the virtual message assigned with the effective display time period is unavailable for search. Therefore, the system, using its system time, utilizes the time parameter to be a reference to obviate the unavailable virtual messages so as to produce the preliminary search result. The mentioned sorting step obviates the virtual messages that have an expired effective display time period.

Further, the search criteria filtering unit 414 performs the sorting step by utilizing an objective data to determine the priority ranking of the virtual messages. The objective data includes a creation time, an updated time, an effective time period, a click through rate and/or ranking relating to the virtual message. The objective data allows the system to determine the priority ranking. For example, the virtual message with an earlier creation time has a higher priority ranking; the virtual message with a newer updated time or higher updating rate has a higher priority ranking; or the content relevant to the virtual message with a higher click through rate has a higher priority ranking. Further, any ranking relating to the content associated to the virtual message can also form relevance of the virtual message. The virtual message with higher ranking can also have higher priority ranking.

Furthermore, in addition to the above-mentioned time parameter, user relevant data and objective data for the system to conduct the sorting, a system weighted value can be one of the references for the sorting process if it is assigned to the virtual message in the system. The virtual message provider in the cloud system assigns a weight value to every virtual message. When the cloud system receives the virtual messages assigned with the weight values, the cloud system comprehensively calculates the system weighted value for every virtual message. The virtual message with higher system weighted value would have a higher priority ranking.

In an exemplary example, the virtual message can be an advertisement. The virtual message provider is such as an advertiser who can propose a price for asking the system to raise the priority ranking of the system weighted value of a specific virtual message. Still further, items such as government orders and or those of public interest can request for higher priority ranking in the sorting. The system actively changes the ranking of sorting through the system weighted value.

After that, the cloud system utilizes the sorting unit 415 to decide a sorting criterion from the various sorting references. This system-based sorting criterion can also be adjustable due to a practical need.

The data transmitting unit 416 in the system then transmits the sorted result to the mobile device which issued the request for searching for the virtual messages. When the mobile device receives the result having one or more sorted virtual messages from the server 41, the virtual messages in the result can be shown using a display screen. One of the virtual messages with the highest priority ranking can be shown first. The user can also select another virtual message, and the program displays the selected one in response to a selection instruction. It should be noted that the virtual message displayed on the display screen is combined with the moving object.

Figure 5:
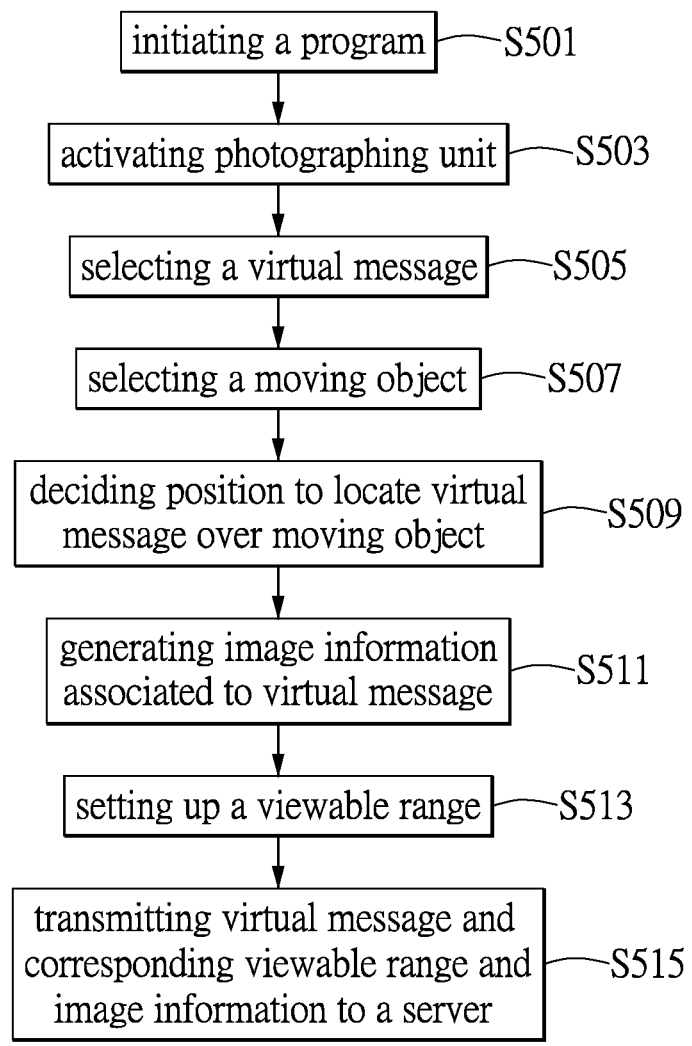
FIG. 5 shows a flow chart describing a method for creating a virtual message of a moving object in one embodiment of the present disclosure.

FIG. 5 next shows a flow chart describing the method for creating a virtual message associated to a moving object according to one of the embodiments in the disclosure.

In the method, a user first manipulates a mobile device to initiate a software program used to create the virtual message, such as in step S501. In the meantime, a photographing unit of the mobile device is activated, such as in step S503. Under a data-construction mode, the user can create a text, a picture, a video, or a sound, or any combination thereof that is used as the virtual message. Alternatively, the software program allows the user to link to a server of the system for selecting one of the virtual messages in a database of the system, such as in step S505. Therefore, the server of the system receives the signal regarding the selected virtual message.

In the current embodiment, the user manipulates the mobile device to capture an image of the moving object to be selected using the photographing unit. In step S507, the software program is operated to receive the image of the moving object, and to extract image information from the image of the moving object through an image processing process. The image information associated to the moving object indicates color block data and/or line data used as the reference for positioning the virtual message. The image information acts as the image feature configured to recognize the virtual message associated to the moving object.

Next, in step S509, under the data-construction mode, when the user operates the mobile device to confirm a position of the moving object to place the virtual message, the image information extracted from the moving object relates to the position of the virtual message. This means the image information indicates the positioning information associated to the virtual message. The server receives the image information that is used to position the virtual message, such as in step S511.

In step S513, the user can utilize an interface rendered by the software program to set up a viewable range. The viewable range is exemplarily configured to define a distance range that restricts people searching for the virtual message. Besides the distance range, the viewable range can include a viewing angle or an elevation angle. In step S515, the data of virtual message and its corresponding viewable range and image information are uploaded to the server. In the meantime, the system also allows the user to set up other searching criteria for confining the range for searching the virtual message. The further searching criteria allowing the people to search and display the virtual message can be a time period and/or a user segment.

Figure 6:
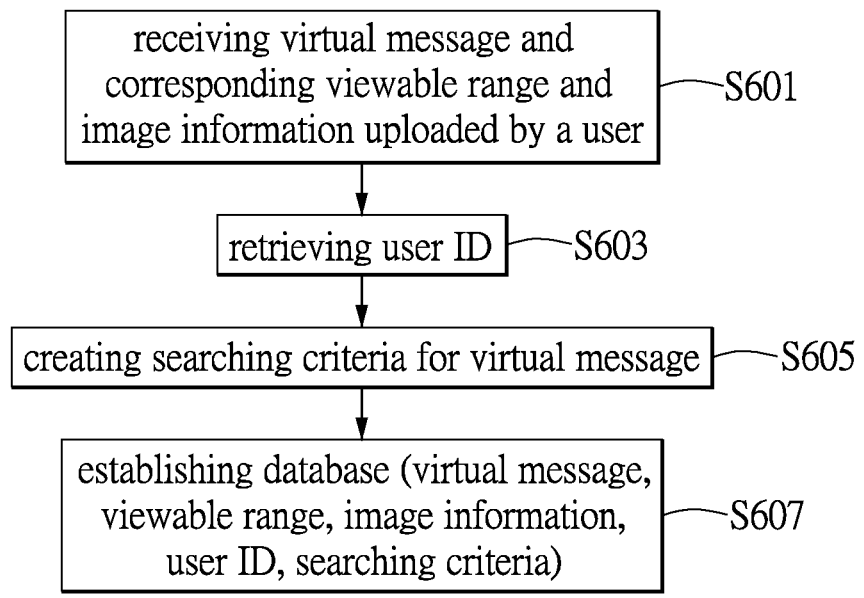
FIG. 6 shows another flow chart describing a method for creating a virtual message of a moving object in one further embodiment of the present disclosure.

FIG. 6 shows one further flow chart describing the method for creating the virtual message over the moving object in one further embodiment in the disclosure. In the process, in step S601, the application system receives the data of the virtual message and the corresponding viewable range and image information uploaded by the user, and the system simultaneously receives the user's identification (user ID), i.e. the information for recognizing the user. For example, the information for recognizing the user can be a user account that is used to initiate the software program and the service, or a unique serial number specified to the mobile device. The information relating the user ID can also be part of the searching criteria for searching the virtual message. In step S605, the searching criteria at least including the user segment are established.

Next, in step S607, the application system receives the data of virtual message, the viewable range, image information, and/or user ID, and the corresponding searching criterial from the end user. The information relating to the virtual message associated to the moving object constitutes the database of the virtual messages.

In one further embodiment, in view of the flow chart shown in FIG. 6, the application system receives the data relating to the virtual message that the user has created over the moving object. The application system also receives the user ID, e.g. a user account that is accompanied with the data of the virtual message.

In one aspect, the moving object can be another registered user defined as a second person who holds a second mobile device with a service account in the system. The application system not only receives the user account and his positioning information, but also the service account and position associated to the moving object, namely the second person's user account and the positioning information generated by the second mobile device. It should be noted that there is also a software program executed in the second mobile device associated to the moving object, and the software program acquires the positioning information of the mobile device so as to acquire a distance between the second mobile device that is associated with the virtual message and the mobile device that is used to create the virtual message. Therefore, the system can identify the moving object, e.g. a second person, and any virtual message associated to this moving object according to its service account. The system can still respond to any searcher by recognizing the virtual message associated to the moving object based on the image information. Thus, a viewable range of the virtual message associated to the moving object can be defined. The system also obtains a distance between the user who searches the virtual message and the moving object, so as to determine if the user can see the virtual message. This difference can also be one reference for setting up the viewable range.

Figure 7:
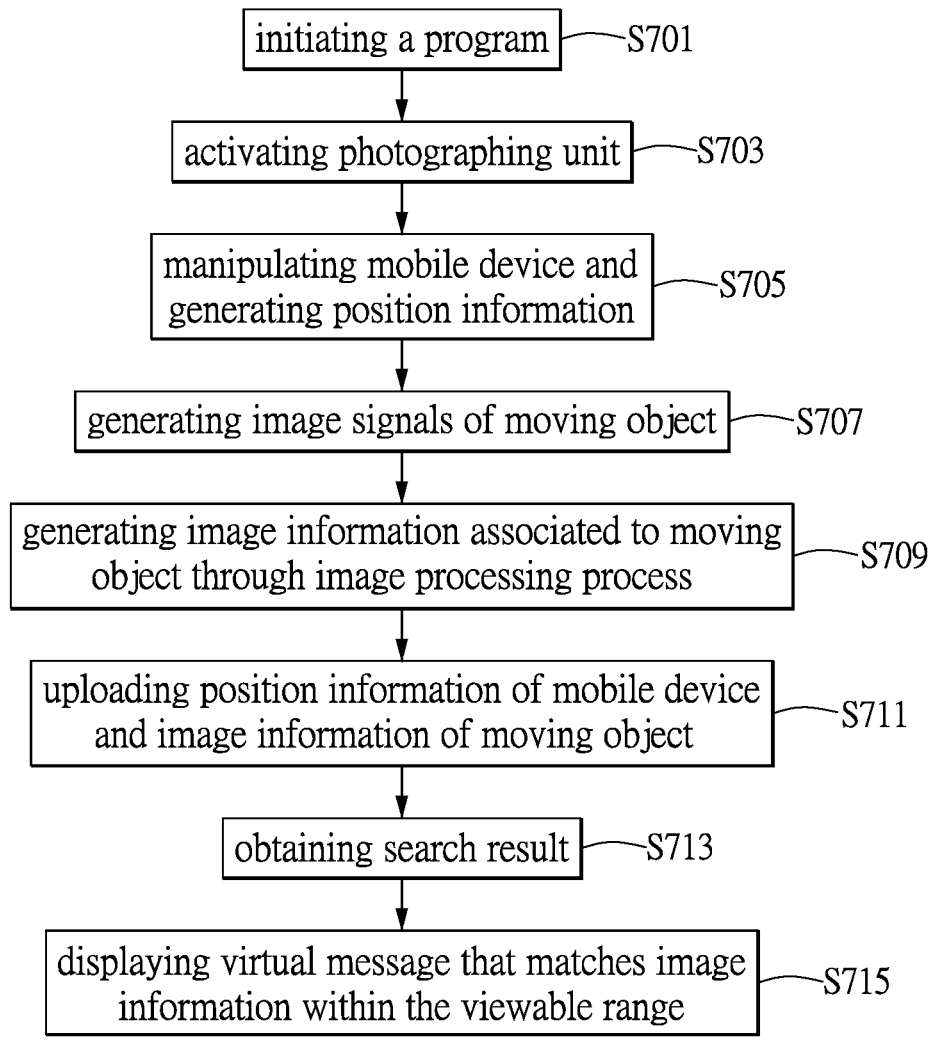
FIG. 7 shows another flow chart describing a method for creating a virtual message of a moving object in one further embodiment of the present disclosure.

Reference is made to FIG. 7 showing a flow chart describing the method for searching the virtual message according to one embodiment in the disclosure.

The application system provides a service allowing the end user to search the virtual message, for example through a technology of augmented reality. The user can uses the software program executed in his mobile device, such as in step S701. Under a search mode, the software program initiates a photographing unit of the mobile device for capturing an image of an object, such as in step S703. The object may be a moving object where a virtual message is placed. In operation, the software program continuously obtains positioning information of the mobile device, such as in step S705. The positioning information is exemplarily the ground-position data generated by a GPS module of the mobile device, and/or the spatial angle data generated by a gyroscope of the mobile device.

In addition to acquiring the image signals of the moving object, such as in step S707, the software program extracts the image information from the moving object through an image processing process, such as in step S709. The image information obtained by the software program can be the color block data and/or the line data associated to the moving object. The image information and/or the positioning information of the mobile device form the information acting as the reference to determine if any virtual message can be found. When compared with the database, any virtual message in the database that matches the searching criteria, such as the image information, can be displayed with the moving object on the mobile device. In one further embodiment, if the moving object is a person who is a registered user in the system, the positioning information generated by his handheld mobile device acts as one of important information for positioning the moving object. A distance between the moving object and the user who searches the virtual message can be obtained based on their positioning information.

It is worth noting that the image information associated to the moving object can be color block data and/or line data, and the information for recognizing a human face, e.g. facial features, can also be the important information for recognizing the moving object and positioning the virtual message if the moving object is another person. The system then provides a search result based on the mentioned image information.

The software program executed in the mobile device obtains the positioning and image information associated to the moving object, and then uploads the information to the server, such as in step S711. The server includes the database that is used to record the virtual messages uploaded by the users, and the corresponding viewable ranges and image information associated to these virtual messages. In the server, a computation process is performed for conducting a comparison against the database. The system can obtain a search result including the virtual message with a viewable range and image information that match a specific searching criteria, and send the search result to the mobile device, such as in step S713. Since the search result includes at least one virtual message, the virtual message that matches the viewable range and image information will be displayed on the mobile device within the viewable range, such as in step S715.

Figure 8:
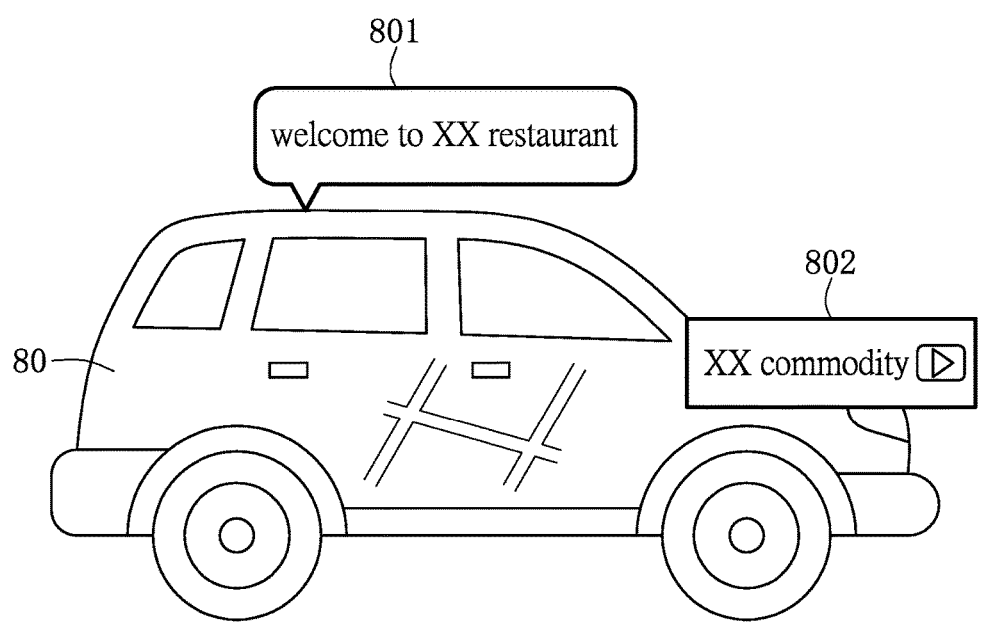
FIG. 8 shows a schematic diagram depicting a circumstance that a virtual message associated to the moving object is displayed in one embodiment of the present disclosure.

FIG. 8 shows a schematic diagram depicting a circumstance that a virtual message is displayed on the moving object.

In the diagram, a moving object 80 is exemplified as a car. More than one virtual message is displayed over the car. When a user manipulates a mobile device to capture an image of the car, the program executed in the mobile device retrieves the image signals and analyzes the image features. The image features may form a part of the information for positioning the one or more virtual messages. When the image information is uploaded to a server, the software process performed in the server conducts a comparison using a database. Finally, in the current example, a first virtual message 801 and a second virtual message 802 are found to be shown over the moving object 80. The first virtual message 801 shows an advertisement message of 'welcome to XX restaurant.' The second virtual message 802 shows a message of 'a commodity' and a related playback message.

Figure 9:
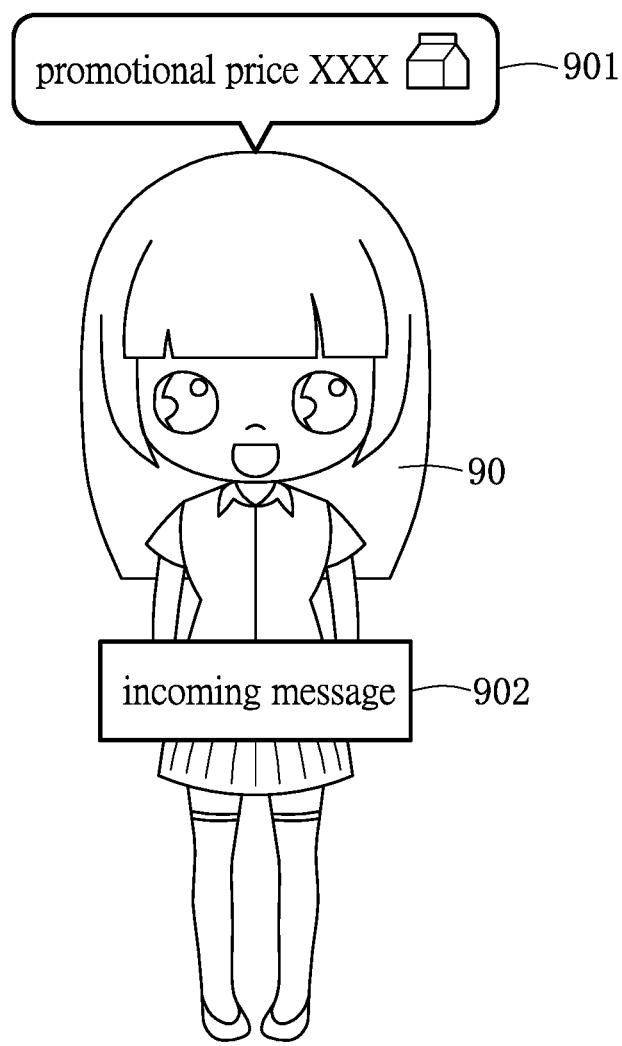
FIG. 9 shows a schematic diagram depicting another circumstance that a virtual message associated to the moving object is displayed in one embodiment of the present disclosure.

FIG. 9 schematically shows another virtual message in one circumstance. A moving object 90 is a person. There are several image features over this person, and the image features form the image information for identifying this moving object and searching any related virtual message. The image information is uploaded to the server for searching any virtual message that matches a specific searching criteria based on the uploaded image information and a corresponding viewable range. After the comparison is performed in the server, a third virtual message 901 showing a message 'promotional price XXX' that combines a text and an icon and a fourth virtual message 902 indicating a message of 'incoming message' are finally displayed. It should be noted that the fourth virtual message 902 may not be a public message to every searcher but only for an individual user that conducts this searching.

Figure 10:
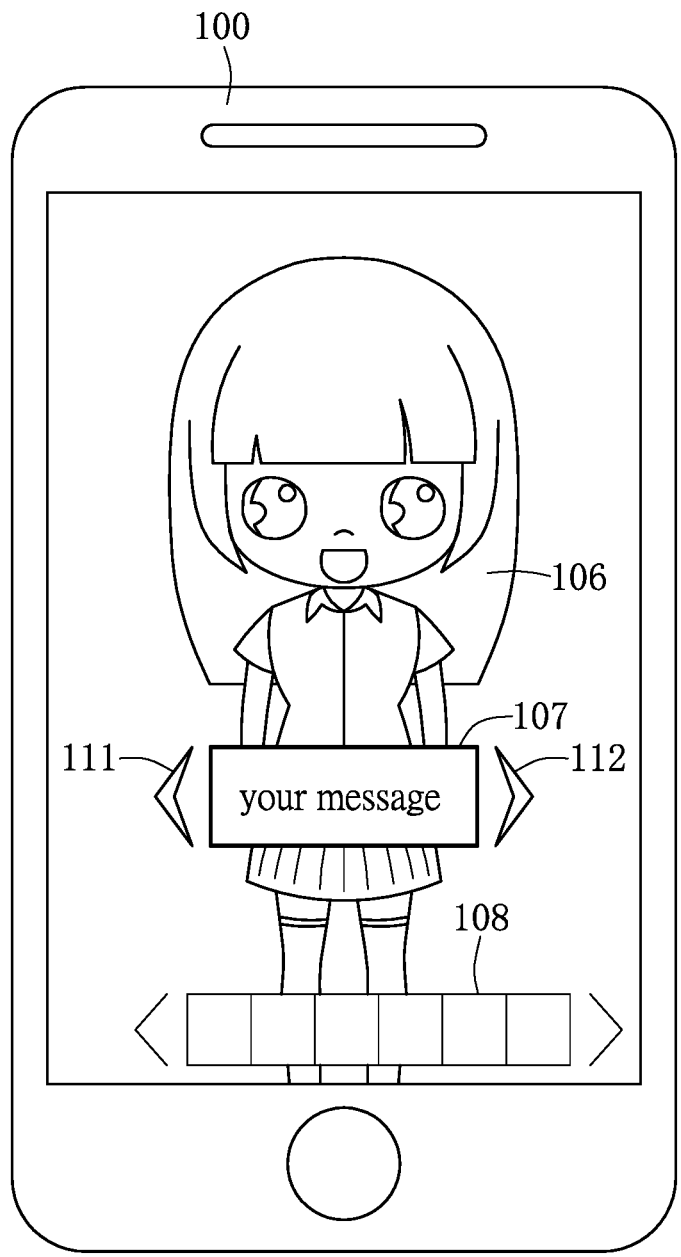
FIG. 10 shows a schematic diagram depicting a search result provided by the system and displayed on a mobile device according to one embodiment of the present disclosure.

FIG. 10 shows one further schematic diagram depicting a circumstance that the application system provides a search result including multiple virtual messages for the mobile device.

A mobile device 100 is provided. An image of a moving object 106 is instantly displayed on the mobile device 100. The server (not shown in this diagram) performs a comparison against the database that records the data of multiple virtual messages based on the image information associated to the moving object 106. The search result shows that a plurality of virtual messages are found in the database based on the image information uploaded by the mobile device 100. The plurality of virtual messages listed in the search result can be filtered by the searching criteria in advance. The plurality of virtual messages can be displayed on the mobile device 100 in a specific way, as shown in the diagram. In the current example, a virtual message 107 with a first ranking is displayed on a main page. A user interface, e.g. a pair of slide-switching indicators 111 and 112, is provided for the user to switch the plurality of virtual messages using a touch-sensitive display. The user can switch the virtual messages by a left-and-right sliding gesture over the touch-sensitive display. A virtual message preview zone 108 is provided for showing further messages for the selection.

FIG. 11 schematically shows a circumstance that the user wears an intelligent device to show the search result in one embodiment.

The mobile device 110 is such as a glasses-type intelligent device. A camera of the intelligent device is used to capture the image of moving object 106'. An image processing method is used to retrieve the image information of the moving object 106'. The image information is then uploaded to a server. When the mobile device 110 displays the first ranking virtual message 117, a pair of gesture-switching indicators 118 and 119 are provided for the user to switch to the other virtual message by a gesture. For example, the user can utilize a left-to-right swiping gesture before the device 110 to switch the virtual messages. A virtual message preview zone 120 is also provided at the bottom of the display.

According to the above embodiments in the disclosure, a method for creating a virtual message associated to a moving object, a method for searching the virtual message and an application system for implementing the methods are provided. Multiple virtual messages that are individually associated to one or more moving objects created by multiple users constitute a database of the application system. The application system provides a service for the end users to search the virtual message in the database. In particular, the positioning information with respect to each virtual message is mainly the image information associated to the moving object. If the user wishes to search a virtual message of a moving object when using a mobile device, the server provides a search result based on the image information associated to the moving object and the positioning information of the mobile device uploaded by the mobile device. The mobile device can instantly display the virtual message that matches the searching criteria over the moving object.

It is intended that the specification and depicted embodiment be considered exemplary only, with a true scope of the invention being determined by the broad meaning of the following claims.

What is claimed is:

1. A method for creating a virtual message onto a moving object, comprising:
   under a data-construction mode, receiving the virtual message selected using a mobile device;
   receiving image information relating to a position where the virtual message is set onto the moving object by the mobile device, wherein the image information is analyzed from an image of the moving object, and the image information of the moving object includes color block and line data used for positioning the virtual message through an image processing process; and
   transmitting data of the virtual message and positioning information of the virtual message to a server so as to establish a database provided for searching for the virtual message.

2. The method as recited in claim 1, wherein the image information of the moving object includes information for recognizing a human face.

3. The method as recited in claim 1, wherein, in the server, an image recognition process applying an artificial intelligence is used to process the image information of the moving object.

4. The method as recited in claim 1, wherein, after the virtual message is set onto the moving object, a viewable range of the virtual message is defined, the viewable range including a distance range measured from the moving object and being uploaded to the server accompanied with the virtual message.

5. The method as recited in claim 4, wherein, in the step of uploading the virtual message, a time period and/or a user segment for viewing the virtual message is set.

6. The method as recited in claim 1, wherein the moving object indicates a second person who holds a second mobile device and the server obtains positioning information generated by the second mobile device so as to acquire a distance between the second mobile device that is associated with the virtual message and the mobile device that is used to create the virtual message.

7. A method for searching a virtual message associated to a moving object, comprising:
   under a search mode, obtaining positioning information related to a mobile device, and the mobile device obtaining an image of the moving object;
   computing image information of the moving object;
   uploading the image information of the moving object and the positioning information to a server; and
   receiving a viewable range for the moving object and a search result that matches the image information from the server, wherein the viewable range includes a distance range measured from the moving object;
   wherein, the server has a database that records multiple virtual messages and their corresponding viewable ranges and image information uploaded by users using their mobile devices; wherein the viewable range and image information corresponding to every virtual message are compared against the database through a computation in the server, so as to obtain the search result that matches the viewable range and image information of every virtual message.

8. The method as recited in claim 7, wherein the positioning information generated by the mobile device includes a ground-position data that is generated by a ground-positioning unit of the mobile device.

9. The method as recited in claim 7, wherein the image information of the moving object includes color block and line data obtained through an image processing process.

10. The method as recited in claim 7, wherein the image information of the moving object is information for recognizing a human face.

11. The method as recited in claim 7, wherein the computation in the server is an image recognition process applying an artificial intelligence.

12. The method as recited in claim 7, wherein the server receives the positioning and the image information, and determines if the positioning information falls within the viewable range associated to the moving object.

13. The method as recited in claim 12, wherein, in the step of comparison against the database in the server, a time period and/or a user segment of the virtual message is also included to perform the comparison.

14. The method as recited in claim 12, wherein the moving object indicates a second person holding a second mobile device, and the server obtains positioning information generated by the mobile device so as to acquire a distance from the mobile device that is associated with the virtual message, so as to determine if the positioning information falls within the viewable range associated to the moving object.

15. An application system, comprising:
    a server, including a database;
    an instruction set stored in a non-transitory computer-readable medium of a mobile device, wherein the instruction set is executed by a processor of the mobile device for performing a process of creating and searching a virtual message of a moving object, and the instruction set includes:
       an image-retrieving instruction for retrieving an image of the moving object that is displayed on the mobile device;
       a virtual message processing instruction for processing the virtual message associated with the moving object in the mobile device, and forming a data of the virtual message transmitted to the server;
       a position data generating instruction for obtaining positioning information generated by a ground-positioning unit of the mobile device;
       an image information generating instruction for processing the image of the moving object, and generating image information used to position the virtual message;
       a search processing instruction for obtaining the positioning and the image information generated by the mobile device under a search mode, transmitting the positioning and the image information to the server, and receiving a search result that matches a searching criteria from the server;
       a data transmitting and receiving instruction for establishing a connection between the mobile device and the server for transmitting and receiving signals there-between;
       a virtual message display instruction for displaying the virtual message based on the search result.

16. The system as recited in claim 15, wherein the database includes a virtual message database used to record data of the virtual message, and a search database used to record image information associated to the virtual message and searching criteria with respect to the virtual message.

17. The system as recited in claim 15, wherein the image of the moving object is used to generate color block and line data with respect to the virtual message, or used for searching the virtual message.

18. The system as recited in claim 15, wherein the moving object is a human face, and the image information includes information for recognizing the human face.

19. The system as recited in claim 15, wherein the searching criteria is a viewable range, a time period and/or a user segment used for searching the virtual message.

* * * * *